United States Patent [19]

Okuda et al.

[11] 4,437,493
[45] Mar. 20, 1984

[54] CONSTANT FLOW CONTROL VALVE

[76] Inventors: Kuniteru Okuda; Jun Morita, both of c/o Oval Engineering Company Limited, 10-8, Kamiochiai 3-chome, Shinjuku-ku, Tokyo, Japan

[21] Appl. No.: 409,342

[22] Filed: Aug. 18, 1982

[30] Foreign Application Priority Data

Aug. 19, 1981 [JP] Japan .................................. 56-128808

[51] Int. Cl.³ ............................................... F15D 1/02
[52] U.S. Cl. ........................................ 138/45; 138/46; 137/504
[58] Field of Search ............................. 138/43, 45, 46; 137/504, 503

[56] References Cited

U.S. PATENT DOCUMENTS

| | | | |
|---|---|---|---|
| 2,207,125 | 7/1940 | Kuebler | 138/46 |
| 2,524,569 | 10/1950 | Matteson | 138/46 |
| 3,015,341 | 1/1962 | Hedland et al. | 137/504 |
| 3,050,086 | 8/1962 | Honsinger | 138/45 |
| 3,120,243 | 2/1964 | Allen et al. | 138/45 |
| 3,130,747 | 4/1964 | Benaway | 138/43 |
| 3,131,716 | 5/1964 | Griswold et al. | 138/46 |
| 3,431,944 | 3/1969 | Sakuma | 138/43 |
| 3,464,439 | 9/1969 | Budzich | 137/504 |

*Primary Examiner*—John W. Shepperd
*Attorney, Agent, or Firm*—Louis E. Marn; Elliot M. Olstein

[57] ABSTRACT

This invention relates to a constant flow control valve comprising a main flow passage whose area is variable by fluctuation of a fluid dynamic pressure, thus permitting a constant flow rate and a by-pass passage which is mounted along an external periphery of the main flow passage, has a by-pass valve opening whose area can be varied as the area of the main flow passage is varied, and is closed and sealed, thus being made to be unusable as necessary.

2 Claims, 7 Drawing Figures

CONSTANT FLOW CONTROL VALVE

BACKGROUND OF THE INVENTION

This invention relates to a constant flow control valve by which flow range can be simply varied.

In a generally known constant flow control valve an orifice is opposed concentrically to a needle in a conduit of a main body, whereby a valve opening is formed. Either one of the orifice and the needle is fixed, the other one being supported resiliently and movably by a coil spring or the like.

By balancing the coil spring with a fluid dynamic pressure acting thereon, it is possible to obtain a constant flow rate by varying the area of the valve opening in a form of inverse function.

In such a conventional constant flow control valve, in order to obtain a constant flow control valve permitting any desired flow rate, it is necessary to replace an orifice or a needle forming a valve opening or a coil spring, etc. with other suitable ones in accordance with respective preset flow rate.

Accordingly, users are obliged to prepare various kinds of orifices, needles and coil springs in accordance with the preset flow rate. This is one of the main disadvantages of the conventional constant flow control valve in that a constant flow control valve capable of varying flow range easily cannot be obtained economically.

BRIEF SUMMARY OF THE INVENTION

It is a general object of this invention to provide a constant flow control valve comprising a main flow passage whose area is variable by fluctuation of a fluid dynamic pressure, thus permitting a constant flow rate and a by-pass passage which is mounted along an external periphery of the main flow passage, has a by-pass valve opening whose area can be varied as the area of the main flow passage is varied, and is closed and sealed, thus being made to be unusable as necessary.

It is another object of this invention to provide a constant flow control valve, wherein a regulating plate having one or more apertures is removably mounted along the one or more inlets of the by-pass passages and kinds of the regulating plates are diversified by the number of the aperture, thus one desired regulating plate is selected and mounted on one or more inlets of the by-pass passages, thereby an opening area of the by-pass passage being variable and a constant flow rate being variable.

It is another object of this invention to provide a constant flow control valve, wherein one unit of the regulating plate having a desired number of aperture is removably mounted along the one or more inlets of the by-pass passages, and the position of the regulating plate is shifted suitably therealong, thereby an opening area of the by-pass passage being variable and a constant flow rate being variable.

It is another object of this invention to provide a constant flow control valve, wherein the number of the by-pass passage communicating with said by-pass valve opening may be one or more as necessary.

It is another object of this invention to provide a constant flow control valve, wherein one or more by-pass passages are closed and sealed and made to be unusable with a blind regulating plate having no aperture as necessary.

Other features and advantages of this invention will be apparent from the following description taken in connection with the accompanying drawings.

BRIEF DESCRIPTION OF THE ACCOMPANYING DRAWINGS

PREFERRED EMBODIMENTS OF THE INVENTION

Figure 1:
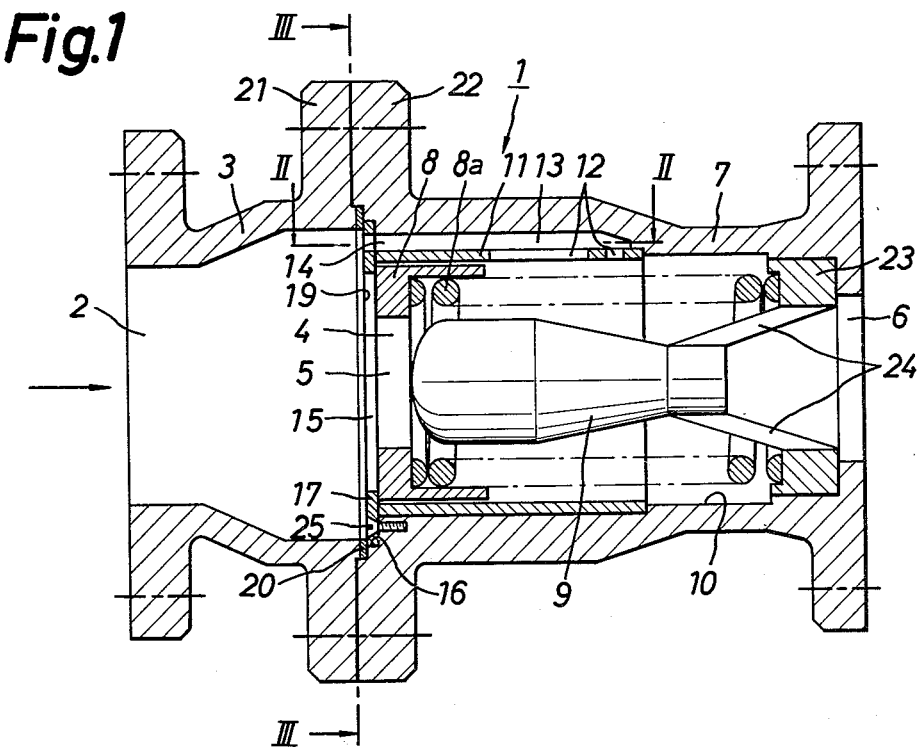
FIG. 1 is a vertical section view of one embodiment of a constant flow control valve according to this invention.

A preferred embodiment of this invention will be described with reference to the accompanying drawings.

Numeral 1 is a constant flow valve body comprising a front tube body 3 and a rear tube body 7. The front tube body 3 is provided with a fluid flow inlet 2, while the rear tube body 7 is provided with a fluid flow outlet 6 which is communicated with a main flow passage 5 in which a main variable valve opening 4 is formed, thereby permitting a constant rate of a fluid.

The main valve opening 4 is supported resiliently by a coil spring 8a, and provided with a cylindrical piston type orifice which is slidable with its center along the center axis of the rear tube body 7, as well as with a needle rod 9 mounted in alignment with the center axis of the orifice 8. In the embodiment of FIG. 1, the needle rod 9 is fixedly disposed within a center bore 10 of the rear tube body 7. In this case, a dynamic pressure of the fluid acting on the coil spring 8a and the orifice 8 is balanced by the coil spring 8a. On the contrary, the needle rod 9 may be made to be movable with the orifice 8 fixed whereby the dynamic pressure of the fluid acting thereon is balanced by a coil spring.

The most important point is that any construction that enables the area of the main valve opening to be varied in accordance with the fluctuation of the fluid pressure can be used similarly to this embodiment.

Numeral 11 is a cylinder which is inserted in fixedly in the center bore 10, permits sliding of the orifice 8 and supports a coil spring 8a. The cylinder 11 comprises a plurality of by-pass holes 12 along its external periphery.

Figure 3:
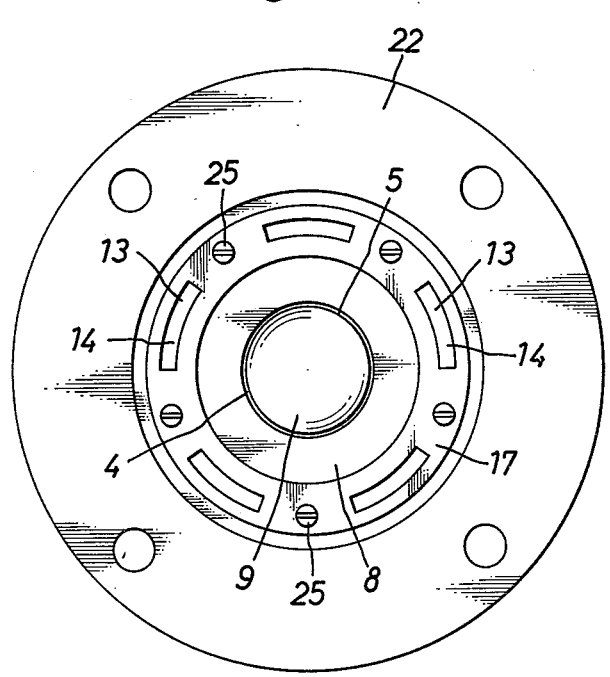
FIG. 3 is a front view of a constant flow control valve body taken on line III—III of FIG. 1.
Figure 4:
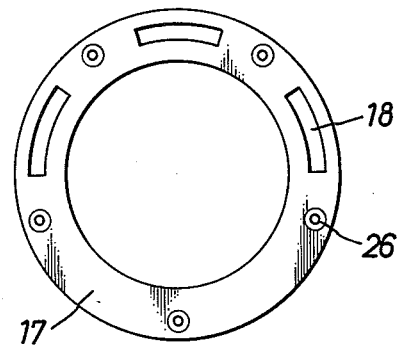
FIG. 4 is a front view of one embodiment of the regulating plate.

Numeral 13 is a by-pass passage which is communicated with the plurality of by-pass holes 12 and defined between the external periphery of the cylinder 11 and an internal wall of the back tube body 7. As shown in FIG. 3, the plurality of by-pass passages 13 are formed around the main valve opening 4.

Numeral 14 is a flow inlet of the by-pass passage 13 which is positioned on the same plane as the orifice 18.

Simultaneously, the flow inlet 14 is positioned on the same plane as a recess 16 formed in an opening 15 of the rear tube body 7.

Numeral 17 is an annular regulating plate which is fixably fitted in the recess 16 with screws 25 or other locking means. The regulating plate 17 is positioned on the same plane as the opening 15 of the rear tube body 7.

According to one embodiment of this invention, the regulating plate 17 may be blind and has no aperture to close all the by-pass passages.

Alternatively, the regulating plate 17 may comprise only one aperture 18 which can be communicated with only one by-pass passage 13, or comprise two apertures 18 or more which can be communicated with two by-pass passages or more. The profile of each aperture may be defined at a user's option.

Although the shape of the regulating plate 17 is annular as shown in FIG. 3, each independent regulating plate may be removably mounted on each flow inlet 14 of the by-pass passage 13.

Further, the flow rate may be the same constant quantity with each of the by-pass passages 13.

Alternatively, the flow rate may be different with respective by-pass passages 13.

Further, an increased flow amount exceeding a constant flow rate may be calculated simply by selecting the number of the by-pass passages 13.

Figure 2A:
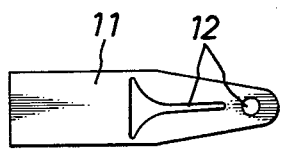
FIG. 2(a) is a plan view of a plurality of by-pass holes taken on line II—II of FIG. 1 wherein the profile of the plurality of by-pass holes is obtained theoretically for permitting a constant flow rate.
Figure 2B:
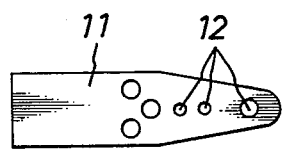
FIG. 2(b) is a plan view of the by-pass holes taken on line II—II of FIG. 1 wherein each profile of the plurality of by-pass holes is a modified form of that of FIG. 2(a) in view of easy workability.

The profiles of the by-pass holes 12 are illustrated in FIGS. 2(a) and 2(b). FIG. 2(a) shows a by-pass hole having an irregular profile which is difficult to work. The irregular profile was obtained theoretically.

FIG. 2(b) shows a circular by-pass hole which is a modified form of that of FIG. 2(b) and easy to work. When the cylindrical piston-shaped orifice 8 is shifted by the upstream dynamic pressure, each area of the by-pass hole 12 is also varied similarly to the main valve opening 4.

Numeral 19 is an opening formed at a rear end of the front tube body 3. The opening 19 faces the opening 15 of the rear tube body 7 by means of a packing 20. By jointing a flange 21 of the front tube body 3 and a flange 22 of the rear tube body 7 by a preferred locking means, the two bodies 3 and 7 are firmly fixed with each other.

Numeral 23 is a support plate for supporting a coil spring 8a. Numeral 24 is a support base for supporting the needle rod 9.

The function of this invention will now be described.

When controlling flow at the constant rate defined by the main valve opening 4, the regulating plate 17 of a blind and holeless type is employed to close all the by-pass passages 13. Namely, since all the by-pass holes are not actuated, the constant flow control is carried out by means of the main valve opening 4.

When it is desired to increase the scope of the constant flow rate, it is necessary to mount the regulating plate 17 having one aperture or more that can communicate with the desired number of the by-pass passages 13 corresponding to the increased amount of the constant flow rate.

Alternatively, each independent regulating plate 17 may be removably mounted on each by-pass passage 13.

When employing the necessary number of the by-pass holes 12 communicating with the by-pass passage 13 together with the main valve opening 4, the area of the main valve opening as well as that of the by-pass holes 12 are varied by the upstream fluid pressure fluctuation, leading to control of the fluid flow rate. Accordingly, the control of the constant flow rate may be carried out in various modified scope.

Figure 5A:
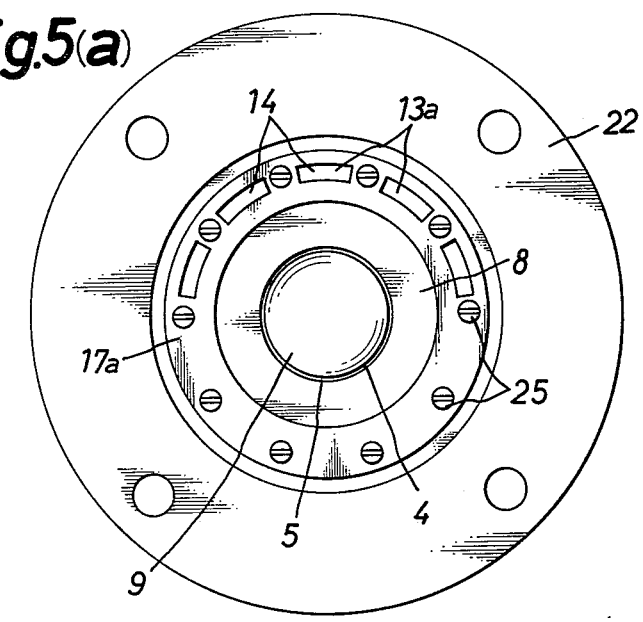
FIG. 5(a) is a plan view of one embodiment of the plurality of by-pass passages and inlets thereof.
Figure 5B:
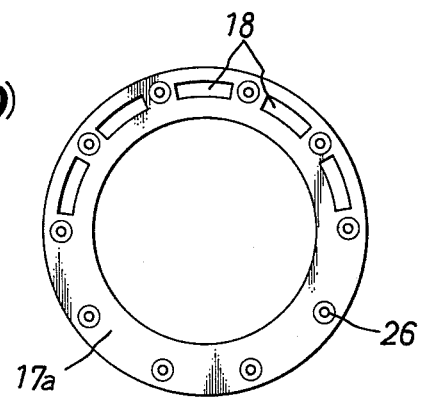
FIG. 5(b) is a plan view of another embodiment of the regulating plate.

As shown in FIG. 5(a), a plurality of by-pass passages 13a together with the flow inlets 14 are formed in the scope of 180° along an external periphery of the main flow passage 5 communicating with the main valve opening 4. In FIG. 5(b), a regulating plate 17a has a plurality of apertures 18 which can be coincident with the by-pass passages 13a. Accordingly, use of one unit of the regulating plate 17a makes it possible to obtain various flow rates by changing the number of the apertures 18 coincident with the by-pass passages 13a.

Whereas the cylindrical piston type orifice 8 is allowed to shift slidably in the above embodiment, it is also possible to control the area of the by-pass holes 12 by utilizing a needle rod 9 of a movable structure intended to control flow rate through the main valve opening 4.

According to this invention, since one or more by-pass passages together with a main flow passage are formed in the constant flow control valve, it is optional to increase the range of the constant flow rate.

Further, selection of one or more by-pass passages may be carried out optionally by one unit of the regulating plate. Accordingly, it is optional to vary the range of the constant flow rate.

Further, since new elements and means of this invention may be incorporated easily in a conventional constant flow control valve body, this novelty constant flow control valve is of a simple structure and provided economically.

Still further, the constant flow valve of this invention has an excellent durability. According to the conventional constant flow control valve, when a differential pressure at a valve inlet and a valve outlet is increased, the flow rate is decreased and a strong vibration of the valve body occurs. As a result, the performance and durability of the conventional constant flow control valve are inferior. According to this invention, even if a differential pressure is increased largely, a constant flow rate can be maintained. Moreover, there occurs no vibration. Thus, the present constant flow control valve can maintain long durability and high performance.

What is claimed is:

1. A constant flow control valve, which comprises:
   a valve body formed with a chamber;
   a cylindrically-shaped sleeve member disposed in said chamber and defining a by-pass passage therebetween, said sleeve member being provided with at least one aperature in fluid communication with said by-pass passage;
   a needle rod co-axially disposed within said sleeve member to define a main flow passage;
   a cylindrically-shaped piston-type body including a main flow orifice slidably disposed within said sleeve member;
   a spring member disposed within said chamber of said control valve and acting on said piston-type body for balancing fluid dynamic pressure thereon; and
   a selectively removable regulator plate means laterally-disposed within said chamber on said sleeve member and over said by-pass passage to permit adjustment of said control valve to a given constant flow rate.

2. The constant flow control valve as defined in claim 1 wherein said regulator plate includes at least one opening thereby permitting variation of an open area of said by-pass passage at said given constant flow rate.

* * * * *